(12) United States Patent
Nagayama et al.

(10) Patent No.: US 8,999,497 B2
(45) Date of Patent: Apr. 7, 2015

(54) BARRIER FILM FOR ELECTRONIC DEVICE AND METHOD OF MANUFACTURING THE SAME

(71) Applicant: Samsung Electronics Co., Ltd., Suwon-si, Gyeonggi-do (KR)

(72) Inventors: Kenichi Nagayama, Yokohama (JP); Yukika Yamada, Yokohama (JP); Hisanao Usami, Ueda (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/713,048

(22) Filed: Dec. 13, 2012

(65) Prior Publication Data
US 2013/0149513 A1    Jun. 13, 2013

(30) Foreign Application Priority Data

Dec. 13, 2011 (JP) .................................. 2011-272328
Aug. 29, 2012 (KR) ........................ 10-2012-0095014

(51) Int. Cl.
| | |
|---|---|
| *B32B 9/04* | (2006.01) |
| *B32B 5/16* | (2006.01) |
| *H01L 51/52* | (2006.01) |
| *C08J 7/04* | (2006.01) |

(52) U.S. Cl.
CPC . *B32B 9/048* (2013.01); *B32B 5/16* (2013.01); *H01L 51/5256* (2013.01); *C08J 7/045* (2013.01)

(58) Field of Classification Search
None
See application file for complete search history.

(56) References Cited

U.S. PATENT DOCUMENTS

| | | | |
|---|---|---|---|
| 3,499,820 A | * | 3/1970 | Desaulniers .................. 428/323 |
| 3,773,551 A | * | 11/1973 | Kiener et al. ................. 428/216 |
| 4,168,962 A | * | 9/1979 | Lambeth .......................... 71/31 |
| 6,903,035 B2 | | 6/2005 | Aono et al. |
| 6,905,769 B2 | * | 6/2005 | Komada ........................ 428/421 |
| 2003/0116061 A1 | | 6/2003 | Aono et al. |
| 2004/0053037 A1 | | 3/2004 | Koch et al. |
| 2006/0141106 A1 | * | 6/2006 | Kodama et al. ............... 426/231 |

(Continued)

FOREIGN PATENT DOCUMENTS

| | | |
|---|---|---|
| JP | 2003041153 A | 2/2003 |
| JP | 2007022075 A | 2/2007 |

(Continued)

OTHER PUBLICATIONS

"Mitsubishi resin Co., Ltd. presents a transparent deposition film of which a vapor barrier characteristic is improved," Electronic Journal vol. 3, 2008, p. 1.

(Continued)

*Primary Examiner* — Aaron Austin
*Assistant Examiner* — Donald M Flores, Jr.
(74) *Attorney, Agent, or Firm* — Cantor Colburn LLP

(57) ABSTRACT

A barrier film for an electronic device includes: a resin film; an adsorption layer disposed on a side of the resin film and including an inorganic material, which is electrostatically chargeable with a positive charge or a negative charge and having higher hydrophilicity than a surface of the resin film; and a stacked layer disposed on a side of the adsorption layer and including a plate-shaped particle layer including an inorganic plate-shaped particle, which is electrostatically chargeable with a positive charge or a negative charge, and a binder layer including a binder particle, which is electrostatically chargeable with a positive charge or a negative charge, where the plate-shaped particle layer and binder layer are alternately stacked.

11 Claims, 6 Drawing Sheets

(56) References Cited

U.S. PATENT DOCUMENTS

| | | | |
|---|---|---|---|
| 2010/0089636 A1* | 4/2010 | Ramadas et al. | 174/521 |
| 2010/0272945 A1* | 10/2010 | Nam et al. | 428/76 |
| 2011/0100454 A1* | 5/2011 | Adam et al. | 136/256 |

FOREIGN PATENT DOCUMENTS

| | | |
|---|---|---|
| JP | 2009113476 A | 5/2009 |
| JP | 2009113484 A | 5/2009 |
| JP | 2010511267 A | 4/2010 |
| JP | 2010253686 A | 11/2010 |
| JP | 2010253687 A | 11/2010 |

OTHER PUBLICATIONS

Lawrence E. Nielsen, "Models for the Permeability of Filled Polymer Systems," J. Macromol. Sci. (Chem), vol. A1, No. 5, 1967, p. 929-942.

* cited by examiner

BARRIER FILM FOR ELECTRONIC DEVICE AND METHOD OF MANUFACTURING THE SAME

CROSS-REFERENCE TO RELATED APPLICATION

This application claims priority to Japanese Patent Application No. 2011-272328, filed on Dec. 13, 2011 and Korean Patent Application No. 10-2012-0095014, filed on Aug. 29, 2012, and all the benefits accruing therefrom under 35 U.S.C. §119, the contents of which in their entireties are herein incorporated by reference.

BACKGROUND

1. Field

A barrier film for an electronic device and a method of manufacturing the same are disclosed.

2. Description of the Related Art

A barrier film including a barrier layer on a resin film to prevent inflow of external oxygen and/or moisture is typically used as a substrate for an electronic device. The barrier film may be effectively applied to a flexible electronic device. As for an organic light emitting diode ("OLED"), a barrier film having various structures has been researched to satisfy water vapor transmission rate ("WVTR") of less than or equal to about $10^{-6}$ gram per square meter per day ($g/m^2/day$).

The barrier film may include a plurality of layers on the resin film to improve barrier performance. However, the barrier film may include foreign materials on the resin film, and a close contacting property between the resin film and the plurality of the layers may be substantially low.

SUMMARY

One or more embodiment provides a barrier film for an electronic device with improved barrier performance by decreasing defects due to a close contacting property among layers.

Another embodiment provides a method of manufacturing the barrier film for an electronic device.

According to one embodiment, a barrier film for an electronic device includes: a resin film; an adsorption layer disposed on a side of the resin film and including an inorganic material, which is electrostatically chargeable with a positive charge or a negative charge and having higher hydrophilicity than a surface of the resin film; and a stacked layer disposed on a side of the adsorption layer and including a plate-shaped particle layer including an inorganic plate-shaped particle, which is electrostatically chargeable with a positive charge or a negative charge, and a binder layer including a binder particle, which is electrostatically chargeable with a positive charge or a negative charge, where the plate-shaped particle layer and binder layer are alternately stacked.

In an embodiment, the inorganic material may be electrostatically chargeable with a charge opposite to a charge of the inorganic plate-shaped particle or the binder particle.

In an embodiment, the binder particle may be a material that is electrostatically chargeable with a charge opposite to a charge of the inorganic plate-shaped particle.

In an embodiment, the inorganic material may include a metal, a metallic compound, a composite material of a metal and an organic material, a composite material of a metallic compound and an organic material, or a combination thereof.

In an embodiment, the inorganic material may include a metal oxide.

In an embodiment, the metal oxide may include silica, alumina or a combination thereof.

In an embodiment, the inorganic plate-shaped particle may include a clay mineral, a phosphate derivative compound, layered double hydroxides or a combination thereof.

In an embodiment, a ratio of the inorganic plate-shaped particle with respect to a total volume of the stacked layer may be greater than or equal to about 50%.

In an embodiment, the adsorption layer may have a thickness greater than or equal to about 0.1 micrometer ($\mu m$).

In an embodiment, the adsorption layer may have a thickness in a range of about 0.1 $\mu m$ to about 10 $\mu m$.

In an embodiment, the stacked layer may have a thickness less than or equal to about 50 nanometers (nm).

In an embodiment, the barrier film for an electronic device may further include a planarization layer disposed on a side of the stacked layer.

In an embodiment, the planarization layer may have lesser surface roughness than the stacked layer.

According to another embodiment, provided is a method of manufacturing a barrier film for an electronic device that includes: providing an adsorption layer including an inorganic material, which is electrostatically chargeable with a positive charge or a negative charge on a resin film; electrostatically charging the surface of the adsorption layer with a positive charge or negative charge; and providing a stacked layer including a plate-shaped particle layer and a binder layer, where the plate-shaped particle layer includes an inorganic plate-shaped particle, which is electrostatically chargeable with a positive charge or a negative charge, the binder layer includes a binder particle, which is electrostatically chargeable with a positive charge or a negative charge on the adsorption layer, and the plate-shaped particle layer and the binder layer are alternately stacked.

In an embodiment, the inorganic plate-shaped particle may be electrostatically chargeable with a charge opposite to a charge of the adsorption layer, and the binder particle may be electrostatically chargeable with a charge opposite to a charge of the inorganic plate-shaped particle.

In an embodiment, the stacked layer may be provided using an adsorption method.

In an embodiment, the adsorption layer may be provided using a wet method.

In an embodiment, the adsorption layer may include a silica film or a silica-organic composite film, provided using a silicon alkoxide compound, a silazane compound, or a combination thereof.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
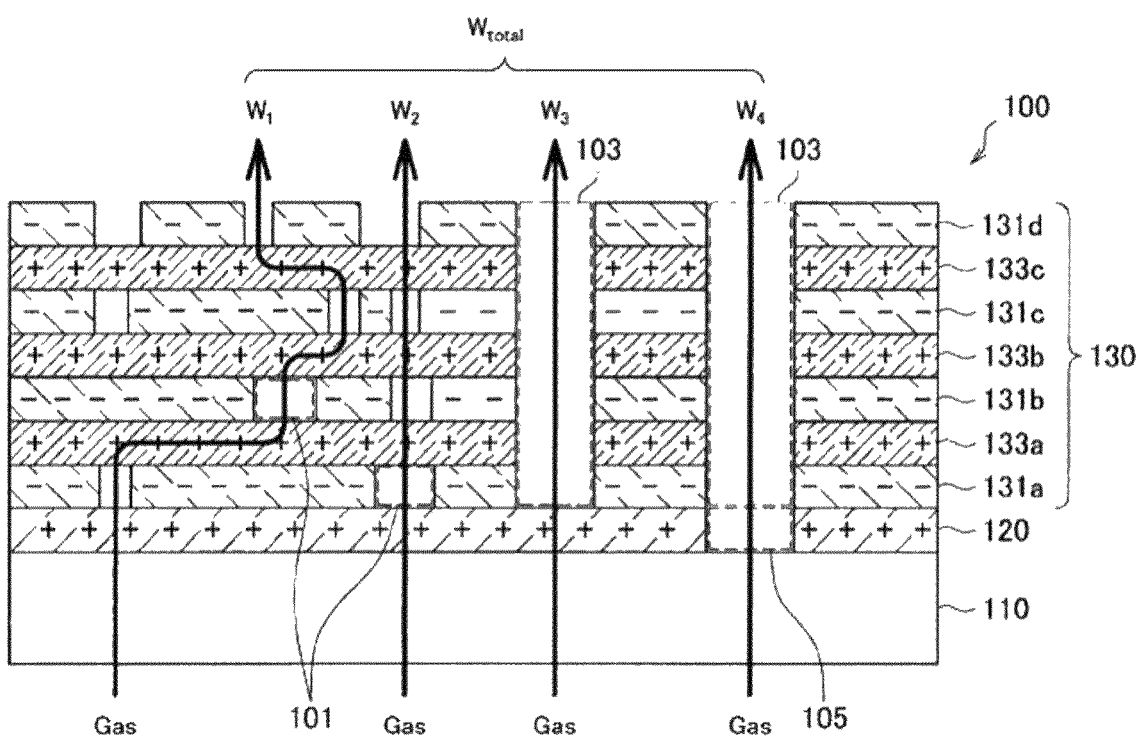
FIG. 1 is a cross-sectional view of an embodiment of a barrier film for an electronic device.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an embodiment of the barrier film for an electronic device will be described referring to the accompanying drawings.

FIG. 1 is a cross-sectional view of an embodiment of a barrier film for an electronic device.

Referring to FIG. 1, an embodiment of the barrier film 100 for an electronic device includes a resin film 110, an adsorption layer 120 disposed on a side of the resin film 110, and a stacked layer 130 disposed on a side of the adsorption layer 120.

The resin film 110 may be a substrate of the barrier film 100. The resin film 110 may include a resin that may be used as a polymer substrate without limitation, In an embodiment, the resin may be, for example polyethylene terephthalate ("PET"), polyethylene naphthalate ("PEN"), polyethersulfone ("PES"), polyimide ("PI"), a copolymer thereof, or a combination thereof.

The adsorption layer 120 may include an inorganic material, which is electrostatically chargeable with a positive charge or negative charge that is an opposite charge to a charge of inorganic plate-shaped particles or binder particles of the stacked layer 130, which will be described later in detail, and has higher hydrophilicity than a surface of the resin film 110.

In an embodiment, the inorganic material of the adsorption layer 120 may include, for example, a metal, a metallic compound, a composite material of a metal and an organic material, a composite material of a metallic compound and an organic material, or a combination thereof. In such an embodiment, the inorganic material of the adsorption layer 120 may include, for example, aluminum (Al), chromium (Cr), silicon (Si), copper (Cu), titanium (Ti), molybdenum (Mo), tantalum (Ta), tungsten (W), gold (Au), an alloy thereof, a metallic compound including the metal, a compound including the alloy, or a combination thereof. In an alternative embodiment, the inorganic material of the adsorption layer 120 may be a composite material including an organic material in a small amount, such that the organic material does not lower the hydrophilicity of the adsorption layer to a predetermined level.

In an alternative embodiment, the inorganic material of the adsorption layer 120 may include, for example, a metal oxide. The metal oxide may include, for example, silica, alumina, or a combination thereof, but not being limited thereto. The metal oxide such as silica and alumina has substantially high light transmittance, and thus may be effectively applied to a highly transparent substrate for a device such as a display device or a solar cell, for example.

A surface of adsorption layer 120 may include a functional group that allows electrostatic treatment to be efficient. In one embodiment, the surface of the adsorption layer 120 may have a hydroxy group (—OH), for example, but not being limited thereto. Accordingly, the electrostatic treatment may be strongly and uniformly performed on the adsorption layer 120.

The adsorption layer 120 is electrostatically treated with opposite charges to a stacked layer 130. The electrostatic treatment of the adsorption layer 120 may have a stronger and more uniform effect than the direct electrostatic treatment on the surface of the resin film 110.

In an embodiment, the adsorption layer 120 may cover foreign materials remaining on the surface of the resin film 110 and effectively prevent a defect due to the foreign materials on the surface of the resin film 110. In an embodiment, the adsorption layer 120 covering the foreign materials on the surface of the resin film 110 may be effectively formed in a wet method.

In an embodiment, the adsorption layer 120 includes an inorganic material as described above, and may have a lower gas transmittance per unit thickness than an organic material such as a resin. The adsorption layer 120 has lower gas transmittance than the resin film 110, and thus the gas transmission thereof is substantially improved.

In an embodiment, the adsorption layer 120 may include an inorganic material as described above, and may have a lower water vapor transmission rate than an organic material such as a resin. The adsorption layer 120 has a water vapor transmission rate of less than or equal to about 0.1 gram per square meter per day (g/m²/day), and may effectively prevent or substantially reduce swelling of the stacked layer 130, which may occur due to moisture.

The adsorption layer 120 may have a thickness of greater than or equal to about 0.1 micrometer (μm). In one embodiment, for example, the thickness of the adsorption layer 120 may be in a range of about 0.1 μm to about 10 μm. In such an embodiment, when the adsorption layer 120 has a thickness within the range, the adsorption layer 120 may be effectively prevented from having a crack, and may cover substantially an entire of the foreign materials remaining on the surface of the resin film 110. In an embodiment, the adsorption layer 120 may have a thickness in a range of about 0.2 μm to about 10 μm. In an alternative embodiment, the adsorption layer 120 may have a thickness in a range of about 0.2 μm to about 2 μm.

The stacked layer 130 includes a plate-shaped particle layer 131a, 131b, 131c or 131d and a binder layer 133a, 133b or 133c, which are alternately stacked.

The plate-shaped particle layer 131a, 131b, 131c or 131d may play a role of a barrier layer, which effectively prevents oxygen and/or moisture from flowing in through the resin film 110 and from being diffused to the top of the stacked layer 130.

In an embodiment, the plate-shaped particle layer 131a, 131b, 131c or 131d may include inorganic plate-shaped particles that are electrostatically chargeable with a positive charge or negative charge. In such an embodiment, the inorganic plate-shaped particles may be sheet-shaped particles having a flat shape. The sheet-shaped particles may be formed with one sheet or a plurality of sheets, which overlaps each other.

In an embodiment, the inorganic plate-shaped particles may have a flat shape, a diameter of about 10 nanometers (nm) to about 10 μm in a planar direction, and a thickness of about 1 nm to about 100 nm. In such an embodiment, the diameter of the inorganic plate-shaped particles in a planar direction may be obtained by arithmetically averaging the diameters of each inorganic plate-shaped particle in a planar direction, and the thickness of the inorganic plate-shaped particle may be obtained by arithmetically averaging the thicknesses of each inorganic plate-shaped particle. The diameter in a planar direction and thickness of the inorganic plate-shaped particles may be measured, for example, using a scanning electron microscope ("SEM"), an atomic force microscope ("AFM"), a laser scattering particle size distribution analyzer, and the like.

The inorganic plate-shaped particles are horizontally disposed with other layers, and may substantially block transmission of oxygen and/or moisture. Accordingly, the inorganic plate-shaped particles may have high barrier performance. In an embodiment, the inorganic plate-shaped particles are disposed in a volume of greater than or equal to about 50% based on the entire volume of the stacked layer 130.

In an embodiment, the inorganic plate-shaped particle may include, for example, a clay mineral, a phosphate derivative compound, a layered double hydroxide ("LDH"), or a combination thereof.

In such an embodiment, the clay mineral may include natural clay and/or synthesized clay, and may include at least one of, for example, mica, vermiculite, montmorillonite, iron montmorillonite, beidellite, saponite, hectorite, stevensite and nontronite. The clay mineral may have a sheet-type structure and be an inorganic polymer compound having a crystalline structure formed by stacking silicate tetrahedral sheets or a crystalline structure formed by stacking a silicate tetrahedral sheet and an octahedral sheet of an aluminum, magnesium or iron.

In such an embodiment, the phosphate derivative compound may include, for example, zirconium phosphate. The zirconium phosphate may have a sheet shape in which a zirconium atom plane is positioned on a net. Herein, a phosphate group is positioned on and beneath the zirconium atom plane and forms $Zr_n(PO_4)_{2n}^{2-}$, the layered crystal main body of which is negatively charged, and ion-exchangeable protons exist among the layers.

The LDH may include, for example a compound represented by the following General Formula 1.

$$[M^{2+}_{1-x}M^{3+}_x(OH)_2]^{x+}[B^{n-}_{x/n} \cdot yH_2O]^{x-} \quad (1)$$

In General Formula 1, $M^{2+}$ denotes a divalent metal, $M^{3+}$ denotes a trivalent metal, $B^{n-}$ denotes an anion, n denotes a valence number of the anion, x denotes a real number of 0<x<0.4, and y denotes a real number of greater than zero (0).

In Genera Formula 1, the layered double hydroxides are compounds having a sheet-type structure in which a negatively-charged middle layer ($[B^{n-}_{x/n} \cdot yH_2O]^{x-}$) is inserted between positively charged brucite basic layers $[M^{2+}_{1-x}M^{3+}_x(OH)_2]^{x+}$. The layered double hydroxides are positively charged and thus maintain overall electrical neutrality of a crystal.

In Genera Formula 1, the divalent metal may be magnesium (Mg), manganese (Mn), iron (Fe), cobalt (Co), nickel (Ni), copper (Cu), zinc (Zn), and the like, and the trivalent metal may be aluminum (Al), iron (Fe), chromium (Cr), cobalt (Co), indium (In), and the like. The anion may be OH$^-$, F$^-$, Cl$^-$, NO$_3^-$, SO$_4^{2-}$, CO$_3^{2-}$, Fe(CN)$_6^{4-}$, CH$_3$COO$^-$, V$_{10}$O$_{28}^{6-}$, C$_{12}$H$_{25}$SO$_4^{4-}$, and the like.

In an embodiment, the inorganic plate-shaped particle having a sheet-shaped structure is a powder, and the powder particles are agglomerated into a particle having a larger diameter. Accordingly, the agglomerated particle may be exfoliated to be dispersed into an aqueous solution.

In an embodiment, the inorganic plate-shaped particle agglomerate may be a layered compound stacked by disposing ions (e.g., sodium ions) charged oppositely to a plurality of positively- or negatively-charged inorganic plate-shaped particles among the inorganic plate-shaped particles. The stacked particles may be exfoliated by inserting a particle having a larger diameter than the ions inserted among the inorganic plate-shaped particles, for example, a water molecule, a calcium ion, a tetrabutyl ammonium ion, and the like. In one embodiment, for example, the layered compound is put in water, and the mixture is agitated to exfoliate agglomerated particles.

The exfoliation of the agglomerated inorganic plate-shaped particles may depend on charge density of the layered compound. In one embodiment, for example, montmorillonite or zirconium phosphate may be an easily-exfoliated inorganic plate-shaped particle. Accordingly, the montmorillonite or zirconium phosphate may be used for easy exfoliation.

The binder layer 133a, 133b or 133c binds the plate-shaped particle layers 131a, 131b, 131c or 131d to each other or the plate-shaped particle layers 131a, 131b, 131c or 131d to the adsorption layer 120. The binder layer 133a, 133b or 133c may include a binder particle that is electrostatically chargeable with a positive charge or a negative charge, and the binder particle may be electrostatically charged with an opposite charge to the inorganic plate-shaped particle.

The binder particles may include, for example, a polymer electrolyte ion, a metal ion, a metallic compound ion, the inorganic plate-shaped particle described above, and the like. The binder layer 133a, 133b or 133c may include at least one material selected among the binder particles or more than two materials having the same charge.

The polymer electrolyte ion may include, for example, a polyallylamine hydrochloride and a polymer electrolyte ion including proton co-ordination bonded with a nitrogen atom of polyacrylamide. The metal ion may be an oxo-acid ion of a metal, for example, VO$_3^-$, MoO$_4^{2-}$, WO$_4^{2-}$, TiO$_2^+$, and the like.

As described above, the inorganic plate-shaped particles may be obtained by exfoliating the inorganic plate-shaped particle agglomerate. In such an embodiment, when the plate-shaped particle layer 131a, 131b, 131c or 131d includes inorganic plate-shaped particles obtained from a clay mineral, the binder layer 133a, 133b or 133c may be formed of inorganic plate-shaped particles obtained from layered double hydroxides. In an alternative embodiment, the plate-shaped particle layer 131a, 131b, 131c or 131d may include inorganic plate-shaped particles obtained from the layered double hydroxides, and the binder layer 133a, 133b or 133c may include inorganic plate-shaped particles obtained from the clay mineral.

The stacked layer 130 may have a thickness of less than or equal to about 50 nm. In such an embodiment, where the stacked layer 130 is substantially thin, the barrier film 100 may have high gas barrier performance.

The barrier film 100 may further include a planarization layer 140 (shown in FIG. 2F) disposed on one surface of the stacked layer 130 and having less surface roughness than the stacked layer 130. In general, when a substrate used for a display element such as a display and the like has high surface roughness, light may be highly scattered and thus leaked out of each pixel and spread. In such an embodiment, the planarization layer 140 is further included in the barrier film 100, and thus may decrease the surface roughness and effectively prevent the light-spread phenomenon due to the light scattering.

In an embodiment, where an organic light emitting diode ("OLED") having a thickness of about 100 nm is included, a substrate having high surface roughness therein may have an influence on device characteristics such as short-circuit of an anode and a cathode and the like. However, this bad influence may be decreased by the planarization layer 140, which may effectively prevent deterioration of the display characteristic.

The planarization layer 140 may be about 1 to 10 times as thick as the surface roughness of the stacked layer 130. In an embodiment, the planarization layer 140 may have a thickness in a range of about 1 nm to about 500 nm, for example. In one embodiment, for example, the planarization layer 140 may have a thickness in a range of about 10 nm to about 200 nm.

In one embodiment, for example, the planarization layer 140 may include the same material as binder layer 133a, 133b or 133c.

In an embodiment, the structure of stacking the adsorption layer 120, the plate-shaped particle layer 131a, 131b, 131c or 131d, the binder layer 133a, 133b or 133c and the planarization layer 140 on the resin film 110 may be identified using, for example, an atomic force microscopy ("AFM") photograph.

Hereinafter, an embodiment of a method of manufacturing the barrier film 100 will be described in detail referring to FIGS. 2A to 2F.

FIGS. 2A to 2F are cross-sectional views sequentially showing an embodiment of a method of manufacturing a barrier film 100.

Figure 2A:
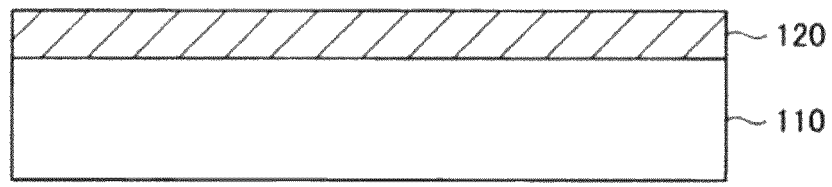
FIGS. 2A to 2F are cross-sectional views sequentially showing an embodiment of a method of manufacturing a barrier film.

First, referring to FIG. 2A, the adsorption layer 120 including an inorganic material is provided, e.g., formed, on the resin film 110. In such an embodiment, the resin film 110 is cleaned by a predetermined method to remove foreign materials remaining on the surface before providing, e.g., forming, the adsorption layer 120. In such an embodiment, the cleaning method of the resin film 110 may be conventionally well known.

Accordingly, the surface of the resin film including an inorganic material has a hydroxy group (—OH) toward the air and may have a strong and uniform electrostatic treatment, which will be described later in detail. The adsorption layer 120 may be provided, formed, using a deposition method, a sputtering method, a chemical vapor deposition ("CVD") method, coating, plating, liquid state extraction or the like, but the invention is not limited thereto. According to an embodiment of the invention, the method of forming the adsorption layer 120 may include a wet film-forming method such as coating, plating, liquid-state extraction, and the like.

In an embodiment, where the wet film-forming method is adopted to form the stacked layer 130, both the adsorption layer 120 and the stacked layer 130 may be formed using a same wet film-forming method. In such an embodiment, the wet film-forming method may use simple equipment, employ a roll-to-roll process, and have a low cost compared with a vacuum film-forming method such as a deposition method, sputtering, a CVD method, and the like.

The coating in the wet film-forming method may include, for example, a sol-gel method, a silazane method, or the like.

The sol-gel method in the coating may provide, e.g., form, a metal oxide film on a substrate in a hydrolysis and dehydration condensation method. The metal alkoxide may have a general formula $(OR)_n$, $M(OR1)_n R2_{x-n}$, (R, R1, and R2 are hydrogen, or a substituent such as an alkyl group, M is a metal such as Ti, Al, Zr, and the like, and x is a valence of a metal). The metal alkoxide may be, for example, silicon alkoxide (e.g., $Si(OC_2H_5)_4$) or tetraethoxysilane ("TEOS", e.g., $Si(OC_2H_5)_4$). The TEOS may form the adsorption layer 120 including silica in the sol-gel method. In an embodiment, 1 to 3 ethoxy groups in the TEOS may be substituted for an alkyl group to form the adsorption layer 120 in the sol-gel method. In such an embodiment, the adsorption layer 120 may have a structure in which an alkyl group is dispersed in a silica network.

The silazane method includes coating a silazane compound on a substrate, heating the coated substrate, and converting the silazane compound into silicon oxide or silicon nitride. The silazane compound may be represented by the general formula: $—(R1R2-Si—NH)_n—$, (R1 and R2 are hydrogen, or a substituent such as an alkyl group). Such a silazane compound may include, for example, perhydropolysilazane ("PHPS") represented by $—(SiH_2NH)_n—$. In such an embodiment, the silazane method may use a compound including an alkyl group and the like substituted for 1 or 2 hydrogens (H) of the PHPS to form the adsorption layer 120. In such an embodiment, the adsorption layer 120 may have a structure that an alkyl group is dispersed in a silica network.

In such an embodiment, the foreign materials on the surface of the resin film 110 may not be completely cleaned and removed. The foreign materials on the resin film 110 may cause the defect in the stacked layer 130 as described above. In an embodiment, the adsorption layer 120 may substantially covers the foreign materials to effectively prevent the defect. The adsorption layer 120 may be provided, e.g., formed, using a wet film-forming method and have a thickness of greater than or equal to about 0.1 μm. The thickness of the adsorption layer 120 may be controlled by adjusting the amount of the inorganic material.

In an embodiment, the adsorption layer 120 may be prepared using, e.g., formed of, an inorganic material, and thus may have low gas transmittance per unit thickness compared with an organic material such as a resin and the like. In such an embodiment, where the adsorption layer 120 has lower gas transmittance than the resin film 110, gas transmission of the barrier film 100 is substantially improved.

In an embodiment, the adsorption layer 120 is prepared using, e.g., formed of, an inorganic material described above, and may have a lower water vapor transmission rate than an organic material such as a resin. In such an embodiment, when the binder layer 133a, 133b or 133c in the stacked layer 130 is provided using, e.g., formed of, a material having hygroscopicity such as a resin and the like, the binder layer 133a, 133b or 133c may be effectively prevented from swelling due to moisture by adjusting the water vapor transmission rate of the adsorption layer 120 to be less than or equal to about 0.1 g/m²/day.

Figure 2B:
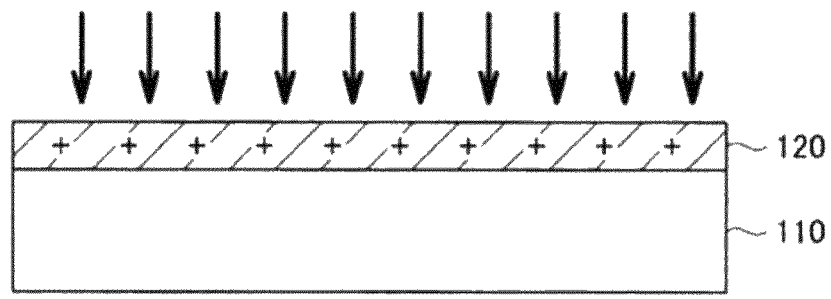

Referring to FIG. 2B, the adsorption layer 120 is electrostatically treated to positively or negatively charge the surface. In an embodiment, the electrostatic treatment may include, for example, a physical treatment such as a corona treatment, an ultraviolet/ozone ("UV/$O_3$") treatment, and the like, an electron beam ("EB") treatment, or a chemical treatment using a chemical solution such as a silane coupling agent. In one embodiment, for example, the adsorption layer 120 may be negatively charged through the corona treatment on the surface. In one embodiment, for example, the silane coupling agent having an amino group may be used to positively charge the surface of the adsorption layer 120.

In such an embodiment, the adsorption layer 120 including an inorganic material has a hydroxy group (—OH) on the surface, and the group (—OH) is ionized and negatively charged through the corona treatment or the UV/$O_3$ treatment. Accordingly, the surface of the adsorption layer 120 may be strongly and uniformly negatively charged.

In an embodiment, when the surface of the adsorption layer 120 is electrostatically treated with the silane coupling agent having an amino group, the silane coupling agent is bonded with the hydroxy group of the adsorption layer 120, and the amino group therein is ionized and positively charged. Accordingly, the surface of the adsorption layer 120 may be uniformly and strongly positively charged.

Then, the stacked layer 130 is provided, e.g., formed, on the adsorption layer 120. In an embodiment, either the plate-shaped particle layer 131a, 131b, 131c or 131d or the binder layer 133a, 133b or 133c may be firstly provided depending on electrostatic charges on the surface of the adsorption layer 120 and on the surface of the plate-shaped particle layer 131a, 131b, 131c or 131d and the binder layer 133a, 133b or 133c. Hereinafter, for convenience of description, an embodiment where the plate-shaped particle layer 131a, 131b, 131c or 131d on the adsorption layer 120 is firstly provided will be described, but the invention is not limited thereto. In an alternative embodiment, but the plate-shaped particle layer 131a, 131b, 131c or 131d may be firstly provided on the binder layer 133a, 133b or 133c.

Figure 2C:
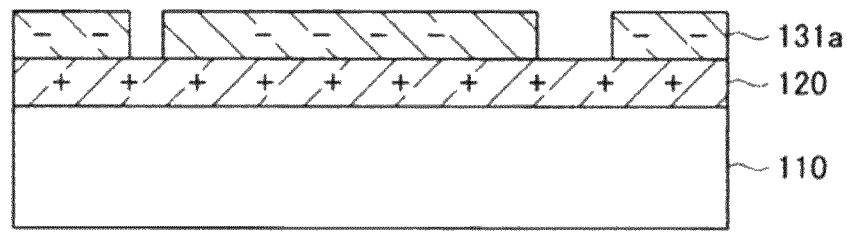

Referring to FIG. 2C, the plate-shaped particle layer 131a, 131b, 131c or 131d is provided, e.g., formed, on the adsorption layer 120 in an adsorption method. The adsorption method is used to dip a substrate charged on the surface in a solution including particles charged oppositely to the substrate and allows the particles to be adsorbed on the surface of the substrate with a coulomb force.

The inorganic plate-shaped particles used to form the plate-shaped particle layer 131a, 131b, 131c or 131d are agglomerated together and form a larger particle, which will be exfoliated and dispersed in an aqueous solution.

In such an embodiment, the inorganic plate-shaped particles are dispersed in an aqueous solution to prepare a solution for forming a plate-shaped particle layer. In an embodiment, the inorganic plate-shaped particles in the solution may have a concentration in a range from about 0.01 gram per liter (g/L) to about 10 g/L. In one embodiment, for example, the inorganic plate-shaped particles in the solution may have a concentration in a range from about 0.1 g/L to about 1 g/L. When the inorganic plate-shaped particles have a concentration within the range, the inorganic plate-shaped particles may be substantially adsorbed in the adsorption layer 120 and maintain predetermined viscosity of the solution, and thus form a uniformly thin film.

The solution for forming a plate-shaped particle layer includes at least water and inorganic plate-shaped particles, and additionally a dispersing agent for increasing dispersion of the inorganic plate-shaped particles or an intercalating agent for promoting exfoliation of the inorganic plate-shaped particles.

Then, when the resin film 110 having the adsorption layer 120 charged oppositely to the inorganic plate-shaped particles is dipped in the solution for forming a plate-shaped particle layer, the inorganic plate-shaped particles are adsorbed in the surface of the adsorption layer 120 due to Coulomb force and form a first plate-shaped particle layer 131a.

Figure 2D:
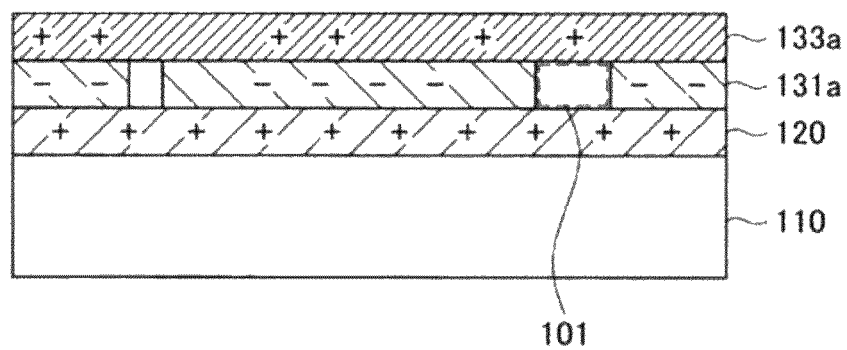

Referring to FIG. 2D, the binder layer 133a, 133b or 133c is provided, e.g., formed, on the plate-shaped particle layer 131a. The binder layer 133a, 133b or 133c includes binder particles electrostatically charged oppositely to the inorganic plate-shaped particles.

The binder layer 133a, 133b or 133c may be formed using the same adsorption method as the plate-shaped particle layer 131a, 131b, 131c or 131d. In an embodiment, the resin film 110 having the adsorption layer 120 (hereinafter referred to as a "film substrate") or the resin film 110 having the plate-shaped particle layer 131a, 131b, 131c or 131d on the surface (hereinafter referred to as a "middle film") is dipped in a solution for forming a binder layer charged oppositely to the film substrate or the middle film, that is, an aqueous solution or a dispersion solution of binder particles. Accordingly, the binder particles are adsorbed on the surface of the film substrate or the middle substrate and form a first binder layer 133a on the surface of the film substrate or the middle film. In such an embodiment, when inorganic plate-shaped particles are used as the binder particles, the inorganic plate-shaped particles are adsorbed substantially parallel to the surface of the film substrate or the middle film.

The binder particle aqueous solution or dispersion solution may be prepared by dissolving or dispersing various water-soluble compounds or the aforementioned inorganic plate-shaped particles in water. In an embodiment, the water-soluble compound or the inorganic plate-shaped particles may have a concentration in a range from about 100 nanomoles per liter (nmol/L) to about 1 mole per liter (mol/L). In one embodiment, for example, the water-soluble compound or the inorganic plate-shaped particles may have a concentration in a range from about 1 micromole per liter ($\mu$mol/L) to about 100 $\mu$mol/L. When the binder particles are included within the concentration range, the binder particles may be substantially adsorbed in the film substrate or the middle film and maintain predetermined viscosity of the aqueous solution or dispersion solution, and thus form a uniform layer.

In an embodiment, the aqueous solution or dispersion solution includes at least water and binder particles. In an embodiment, where the binder particles are inorganic plate-shaped particles, a dispersing agent for increasing dispersion of the inorganic plate-shaped particles or an intercalating agent for promoting exfoliation of the inorganic plate-shaped particles may be additionally included.

In an embodiment, where the binder particle is a polymer electrolyte ion, the water-soluble compound may be, for example, an ionic polymer such as a polyallylamine hydrochloride or polyacrylic acid. In an embodiment, where the binder particle is a metal ion, the water-soluble compound may include a metal sulfate, a metal chloride, or a metal hydroxide, for example, $AlK(SO_4)_2$, $AlNH_4(SO_4)_2$, $MgCl_2$, $Mg(NO_3)_2$, $KOH$, $K_2SO_4$, $KCl$, $FeK(SO_4)_2$, $CoCl_2$, $Co(NO_3)_2$, $MnCl_2$, $Mn(NO_3)_2$, $NiCl_2$, $Ni(NO_3)_2$, $CuCl_2$, $Cu(NO_3)_2$, $ZnCl_2$, $Zn(NO_3)_2$, and the like.

In an embodiment, where the binder particle is a metallic compound ion, the water-soluble compound may include sodium oxalate or ammonium oxalate, and the like, for example, $NaVO_3$, $(NH_4)_2MoO_4$, $(NH_4)_2WO_4$, $TiOSO_4$, and the like.

Then, when the film substrate or the middle film is dipped in the solution for forming a binder layer, the binder particles are adsorbed on the surface of the adsorption layer 120 or the plate-shaped particle layer 131a, 131b, 131c or 131d due to Columbic force and form a first binder layer 133a.

Figure 2E:
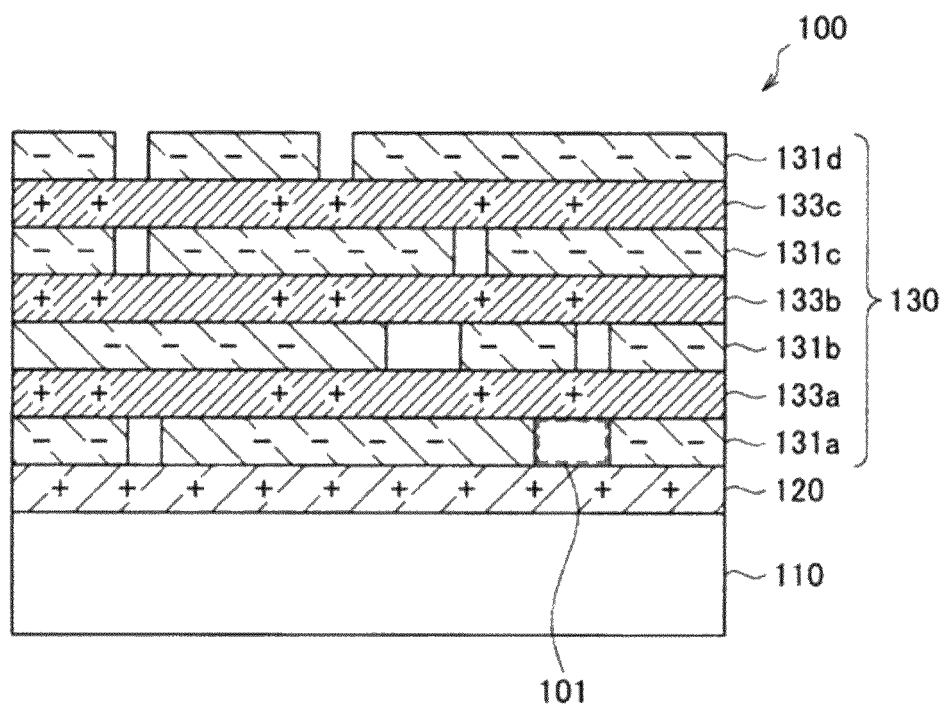

Referring to FIG. 2E, the plate-shaped particle layer 131a, 131b, 131c or 131d and the binder layer 133a, 133b or 133c are repeatedly and alternately provided as described above. In an embodiment, the plate-shaped particle layer 131a, 131b, 131c or 131d and the binder layer 133a, 133b or 133c are alternately formed on the adsorption layer 120 to form a predetermined layer having an alternative adsorption structure of plate-shaped particle layers 131b, 131c and 131d and binder layers 133b and 133c.

As described above, an embodiment of the barrier film 100 according to the invention is obtained by forming a stacked layer 130 prepared by alternately stacking a plurality of plate-shaped particle layers 131a, 131b, 131c and 131d and a plurality of binder layers 133a, 133b and 133c on the adsorption layer 120 using an adsorption method.

Figure 2F:
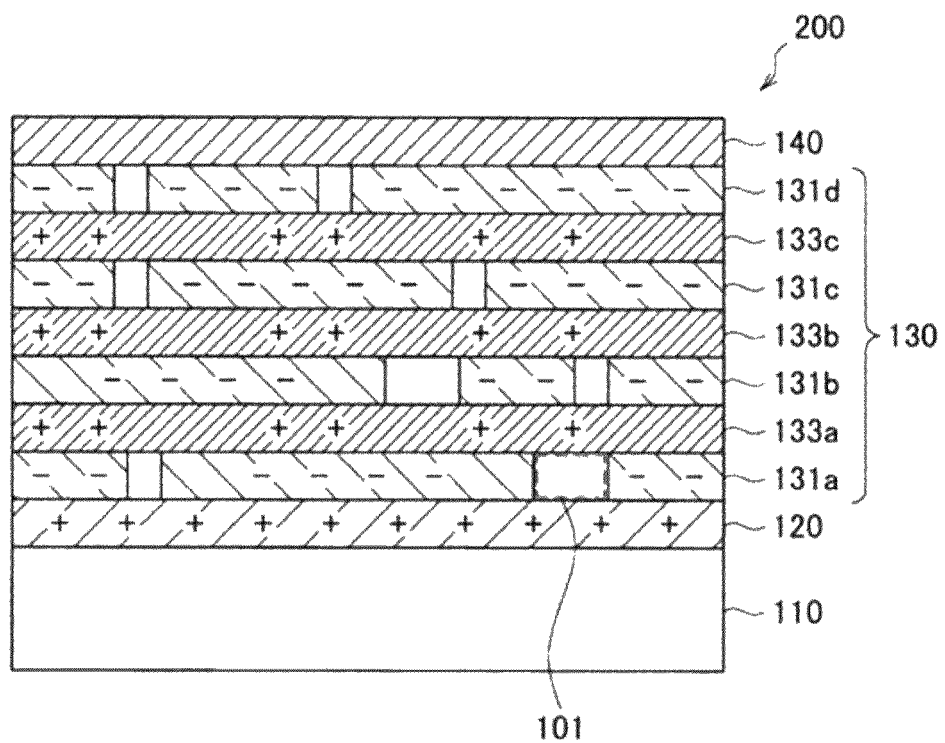

In an embodiment, the planarization layer 140 may be further provided, e.g., formed, on the stacked layer 130, as shown in FIG. 2F. In such an embodiment, the planarization layer 140 may have less surface roughness than the stacked layer 130. The planarization layer 140 may be provided using, e.g., formed of, the same material and the same method as the binder layer 133a, 133b or 133c, thereby obtaining a barrier film 200 having the planarization layer 140 on the surface.

Hereinafter, referring back to FIG. 1, the barrier film 100 for suppressing transmission of external gas such as oxygen, water vapor, or the like will be described.

FIG. 1 shows the adsorption layer 120 and the stacked layer 130 as a barrier layer formed on the resin film 110. The stacked layer 130 includes four plate-shaped particle layers 131a, 131b, 131c and 131d and three binder layers 133a, 133b and 133c. FIG. 1 shows a structure of the adsorption layer 120 contacting the plate-shaped particle layer 131a.

As shown in FIG. 1, external gas such as water vapor or oxygen entering through the resin film 110 may not pass the plate-shaped particle layer 131a, 131b, 131c or 131d including sheet-type inorganic plate-shaped particles, but may pass the barrier layer through transmission paths, e.g., a first transmission path W1, a second transmission path W2, a third transmission pass W3 and a fourth transmission path W4.

In such an embodiment, as shown in FIG. 1, the gas transmission path may be classified into the following four different kinds of paths. The amount of gas passing these four transmission paths is equal to the gas transmission amount ($W_{total}$) of the barrier film 100.

First of all, the first transmission path W1 passes a pore part 101 having no inorganic plate-shaped particles in the plate-shaped particle layers 131a, 131b, 131c or 131d and is overall bent and wound through the binder layers 133a, 133b and 133c, and thus transmits through the barrier film 100.

The first transmission path W1 has gas transmittance that is substantially proportionate to a square of the volume fraction of the inorganic plate-shaped particles in the stacked layer 130, is substantially proportionate to a square of the aspect ratio the inorganic plate-shaped particles, and is substantially proportionate to gas transmittance of a binder layer unit (refer to Japanese patent publication No. 2007-22075).

The second transmission path W2 passes the pore parts 101 of the plate-shaped particle layers 131a, 131b, 131c and 131d and the binder layers 133a, 133b and 133c and transmits substantially straightly through the barrier film 100.

The third transmission path W3 passes a defect 103 such as a pin hole and the like in the adsorption layer 120 and the stacked layer 130.

The fourth transmission path W4 passes a defect 105 such as a pin hole in the adsorption layer 120 and the defect 103 such as a pin hole and the like in the stacked layer 130.

In an embodiment, the gas transmittances T1, T2, T3 and T4 of the first to fourth transmission paths W1, W2, W3 and W4 may be respectively decreased to decrease the gas transmittance T1 of the barrier film 100. The gas transmittance is substantially equal to the sum of transmission length, transmission cross-section and gas transmittance of a transmission material. In an embodiment, when the defects 103 and 105 are small, the third and fourth transmission paths W3 and W4 have a small transmission cross-section, and thus the gas transmittances T3 and T4 of the third and fourth transmission paths W3 and W4 are substantially reduced.

In such an embodiment, when the adsorption layer 120 has small gas transmittance, the gas transmittances T1, T2, T3 and T4 of the first to fourth transmission paths W1, W2, W3 and W4 may become substantially small. In such an embodiment, when the adsorption layer 120 has a larger film thickness (the film thickness may be measured by, for example, using an ellipsometer, AFM, and the like), the first to third gas transmittances T1, T2 and T3 of the first to third transmission paths W1, W2 and W3 may become substantially small.

When the inorganic plate-shaped particles are more adsorbed in the plate-shaped particle layer 131a, 131b, 131c or 131d, the second transmission path W2 may become smaller and decrease the second gas transmittance T2. Simultaneously, since more adsorbed inorganic plate-shaped particles increase the volume fraction of the plate-shaped particle layer 131a, 131b, 131c or 131d included in the stacked layer 130 and make the first transmission path W1 more bent and wound, the first transmission path W1 may have a longer length L1 and thus smaller gas transmittance T1.

When the stacked layer 130 includes more alternative adsorption units (one unit is defined by one plate-shaped particle layer 131a, 131b, 131c or 131d and one barrier layer 133a, 133b or 133c), the stacked layer 130 has the same effect as increasing the adsorption amount of inorganic plate-shaped particles in the plate-shaped particle layer 131a, 131b, 131c or 131d.

When the binder layer 133a, 133b or 133c has a smaller film thickness (e.g., an arithmetic average film thickness of each binder layer 133a, 133b and 133c, where the film thickness may be measured, for example, using an ellipsometer, AFM, or the like), the first transmission path W1 has a smaller cross-section, thereby decreasing the gas transmittance T1 thereof.

In an embodiment, the barrier film 100 may decrease the number of alternative adsorption units in the stacked layer 131a, 131b, 131c or 131d as well as the gas transmittance and thus may simplify a process. In such an embodiment, the adsorption layer 120 includes an inorganic material described above, and thus decreases the gas transmittances T1, T2, T3 and T4 of the first to fourth transmission paths W1, W2, W3 and W4. In an embodiment, the binder layer 133a, 133b or 133c is provided, e.g., formed, using the adsorption method and may have a thin film thickness.

In the barrier film 100, the plate-shaped particle layer 131a, 131b, 131c or 131d is provided, e.g., formed, by exfoliating an inorganic plate-shaped particle agglomerate into inorganic plate-shaped particles and using the inorganic plate-shaped particles instead of the inorganic plate-shaped particle agglomerate that is swollen by moisture. In such an embodiment, the inorganic plate-shaped particle agglomerate is put in water and agitated for exfoliation. Then, the exfoliated inorganic plate-shaped particles may be absorbed in the resin film 110 or the binder layer 133a, 133b or 133c in an electrostatic adsorption method and form the plate-shaped particle layer 131a, 131b, 131c or 131d.

Accordingly, in an embodiment, the barrier film 100 effectively prevents external gas such as moisture and the like from entering the plate-shaped particle layer 131a, 131b, 131c or 131d and from infinitely swelling the plate-shaped particle layer 131a, 131b, 131c or 131d.

In an embodiment, the inorganic plate-shaped particles are adsorbed in another layer by a Coulomb force and increase close contacting property between plate-shaped particle layer 131a, 131b, 131c or 131d and the other layer. Accordingly, the inorganic plate-shaped particles substantially improve barrier performance of the barrier film 100.

In an embodiment, the barrier film 100 includes the adsorption layer 120 including an inorganic material having many hydroxy groups on the surface and may adsorb inorganic plate-shaped particles with high density. As a result, the barrier film 100 may decrease the number and area of the pore part 101 including no inorganic plate-shaped particles and the defect 103, and thus decrease gas transmittance passing through the first to third transmission paths W1, W2 and W3, thereby substantially improving barrier performance.

In an embodiment, the adsorption layer 120 has a water vapor transmission rate of less than or equal to about 0.1 $g/m^2/day$ and thus substantially reduces or effectively prevents swelling of the binder layer 133a, 133b or 133c in the stacked layer 130. As a result, the adsorption layer 120 may maintain a thin film thickness and thus decrease gas transmittance passing through the first and second transmission paths W1 and W2.

In an embodiment, the barrier film 100 covers foreign materials on the resin film 110 with the adsorption layer 120, and thus may decrease an influence due to the foreign materials and a drawback due to the foreign materials contacting the stacked layer 130. In such an embodiment, the number and area of the third and fourth transmission paths W3 and W4 passing through the defect 103 such as a pin hole and the like in the stacked layer 130 may be decreased to decrease gas transmittance. The gas transmittance may be further decreased when the adsorption layer 120 becomes thicker. When the adsorption layer 120 is provided, e.g., formed, using a wet film-forming method, the gas transmittance may be substantially decreased.

In an embodiment, the barrier film 100 having the adsorption layer 120 including an inorganic material may have barrier performance in a certain degree. When the stacked layer 130 has the defect 103, gas passes the third transmission path W3 where the defect 103 in the stacked layer 130 is not overlapping the defect 105 of the adsorption layer 120 rather than the fourth transmission path W4 in a conventional barrier film. In such an embodiment, since the gas transmittance T3 of the third transmission path W3 is less than the gas transmittance T4 of the fourth transmission path W4 per the same area, the barrier film 100 has less gas transmittance than a conventional barrier film and may have high barrier performance.

Hereinafter, embodiments will be described in detail with reference to examples. However, the following examples are exemplary embodiments, and the invention is not limited thereto or thereby.

Example 1

(1) Cleaning of Resin Film

A 0.2 millimeter (mm)-thick PEN film (Teonex® Q65FA, Teijin DuPont Films Ltd.) is cleaned using a detergent and pure water, and then dried using an air blower.

(2) Formation of Adsorption Layer

On the cleaned resin film, PHPS (Aquamica NL 100A, AZ Electronic Materials Co.) is spin-coated, and then cured at 200° C. for 1 hour. The spin-coated film is cured for 3 hours under a condition of 95° C./80 percent relative humidity (% RH) to form an about 0.5 µm-thick silica layer.

(3) Preparation of Solution for Plate-Shaped Particle Layer

A solution for forming a plate-shaped particle layer is prepared by adding 0.5 g of montmorillonite ("MMT") (Kunfil-D36, Kunimine Industries Co., Ltd.) to 1 L of pure water and agitating the mixture using a commercially-available stirrer for one day.

(4) Preparation of Solution for Binder Layer

A 30 millimoles per liter (mM/L) aqueous polyallylamine hydrochloric acid salt solution is prepared to form a binder layer.

(5) Electrostatic Treatment of Resin Film

The resin film having the adsorption layer according to the process (2) is treated with corona discharge for about 10 minutes.

(6) Formation of Binder Layer

The resin film electrostatically treated according to the process (5) is dipped in the solution for forming a binder layer according to the process (4) for about 15 minutes, sufficiently cleaned with pure water, and dried with an air blower to form a binder layer.

(7) Formation of Plate-Shaped Particle Layer

The resin film having a binder layer according to process (6) is dipped in the solution for forming the plate-shaped particle layer according to process (3) for about 15 minutes, sufficiently cleaned with pure water, and dried with an air blower, forming a plate-shaped particle layer.

(8) Formation of Stacked Layer

The processes (6) and (7) are repeated 5, 10 and 20 times to respectively laminate 5, 10 and 20 unit binder layer/plate-shaped particle layers on the resin film to form a stacked layer, thereby obtaining a barrier film.

(9) Measurement of Water Vapor Transmission Rate ("WVTR")

The resin film having an adsorption layer formed according to the process (2) and three sheets of the barrier film according to the process (8) are measured regarding a WVTR using a water vapor transmission measurement device (AQUATRAN®, MOCON Inc.).

Example 2

(1) Cleaning of Resin Film

A 0.2 mm-thick PEN film (Teonex® Q65FA, Teijin DuPont Films Ltd.) is cleaned with a detergent and pure water and dried with an air blower.

(2) Formation of Adsorption Layer

On the cleaned resin film, PHPS (Aquamica NL 100A, AZ Electronic Materials Co.) is spin-coated and cured at 200° C. for 1 hour. Then, the cured film is cured under a condition of 95° C./80% RH for 3 hours to form an about 0.5 µm-thick silica layer.

(3) Preparation of Solution for Plate-Shaped Particle Layer

Then, 0.5 g of MMT (Kunfil-D36, Kunimine Industries Co.) is put in 1 L of pure water, and the mixture is agitated using a commercially-available stirrer for a day, preparing a solution for forming a plate-shaped particle layer.

(4) Preparation of Solution for Binder Layer

A 30 mM/L polyallylamine hydrochloric acid salt aqueous solution is prepared as a solution for forming a binder layer.

(5) Electrostatic Treatment of Resin Film

The resin film having an adsorption layer according to the process (2) is dipped in a 10 mM/L ethanol solution including 3-aminopropyltriethoxysilane ("APTES") for 30 minutes, cleaned with ethanol and pure water, and dried with an air blower.

(6) Formation of Plate-Shaped Particle Layer

The resin film electrostatically treated according to the process (5) is dipped in a solution for forming a plate-shaped particle layer according to the process (3) for 15 minutes, sufficiently cleaned with pure water, and dried with an air blower, forming a plate-shaped particle layer.

(7) Formation of Binder Layer

The resin film having the plate-shaped particle layer according to the process (6) is dipped in a solution for forming binder particles according to the process (4) for 15 minutes, sufficiently cleaned with pure water, and dried with an air blower, forming a binder layer.

8) Formation of Stacked Layer

The processes (6) and (7) are repeated 5, 10 and 20 times to respectively laminate 5, 10 and 20 units of the plate-shaped particle layer/binder layers on the resin film to form a stacked layer, thereby obtaining a barrier film.

(9) Measurement of WVTR

The resin film having an adsorption layer formed by performing up to the process (2) and three sheets of the barrier films according to the process (8) are measured regarding a WVTR using a water vapor transmission measurement device (AQUATRAN®, MOCON Inc.).

(10) AFM Examination

The resin film having an adsorption layer and a plate-shaped particle layer according to the process (6) is examined using an atomic force microscope (SPA 400, SII Nano Technology Inc.) to identify an adsorption state of MMT.

(11) Fabrication of Sample for Measuring Thickness

A silicon wafer 500452 (Nilaco Co.) is cleaned with a detergent and pure water and dried with an air blower. Then, 5, 10 and 20 units of plate-shaped particle layer/binder layers are respectively laminated on the silicon wafer according to the processes (5) to (8) to form a stacked layer, which is a sample for measuring a thickness thereof.

(12) Thickness Measurement of Stacked Layer

The stacked layer sample for thickness measurement according to the process (11) is measured regarding thickness using an ellipsometer NL-ELP (Japan Laser Electronics Co. Ltd.).

Example 3

(1) Cleaning of Resin Film

A 0.2 mm-thick PEN film (Teonex® Q65FA, Teijin DuPont Films Ltd.) is cleaned using a detergent and pure water and then dried using an air blower.

(2) Formation of Adsorption Layer 8 g of TEOS, 2.5 g of pure water, 0.01 g of hydrochloric acid, and 9.5 g of ethanol are put in a glass container and agitated for one day. The solution is spin-coated on the resin film according to the process (1), and the coated TEOS is cured at 200° C. for 1 hour, forming an about 0.5 μm-thick silica layer.

(3) Preparation of Solution for Forming Plate-Shaped Particle Layer

Then, 0.5 g of MMT (Kunfil-D36, Kunimine Industries Co.) is put in 1 L of pure water and the mixture is agitated with a stirrer, preparing a solution for forming a plate-shaped particle layer.

(4) Preparation of Solution for Forming Binder Layer

A 30 mM/L polyallylamine hydrochloric acid salt aqueous solution is prepared as a solution for forming a binder layer.

(5) Electrostatic Treatment of Resin Film

The resin film having an adsorption layer according to the process (2) is dipped in a 10 mM/L ethanol solution including 3-APTES for 30 minutes, and then cleaned with ethanol and pure water and dried with an air blower.

(6) Formation of Plate-Shaped Particle Layer

The resin film electrostatically treated according to the process (5) is dipped in the solution for forming a plate-shaped particle layer according to the process (3) for 15 minutes, sufficiently cleaned with pure water, and dried with an air blower, forming a plate-shaped particle layer.

(7) Formation of Binder Layer

The resin film having the plate-shaped particle layer according to the process (6) is dipped in the solution for forming binder particles according to the process (4) for 15 minutes, sufficiently cleaned with pure water, and dried with an air blower, forming a binder layer.

(8) Formation of Stacked Layer

The processes (6) and (7) are respectively repeated 5, 10 and 20 times to form a stacked layer by laminating 5, 10 and 20 units of plate-shaped particle layers/binder layers on a resin film, obtaining a barrier film.

(9) Measurement of WVTR

The resin film having an adsorption layer formed by performing up to the process (2) and three sheets of the barrier film according to the process (8) are measured using a water vapor transmission measurement device (AQUATRAN®, MOCON Inc.).

Example 4

(1) Cleaning of Resin Film

A 0.2 mm-thick PEN film (Teonex® Q65FA, Teijin DuPont Films Ltd.) is cleaned with a detergent and pure water and dried with an air blower.

(2) Formation of Adsorption Layer

On the resin film according to the process (1), $Al_2O_3$ is sputtered to form an about 0.2 μm-thick alumina layer using a sputter device, SBH-2306RE.

(3) Preparation of Solution for Forming Plate-Shaped Particle Layer 0.5 g of MMT (Kunfil-D36, Kunimine Industries Co.) is put in 1 L of pure water, and the mixture is agitated with a stirrer for a day, preparing a solution for forming a plate-shaped particle layer.

(4) Preparation of Solution for Forming Binder Layer

A 30 mM/L polyallylamine hydrochloric acid salt aqueous solution is prepared as a solution for forming a binder layer.

(5) Electrostatic Treatment of Resin Film

The resin film having the adsorption layer according to the process (2) is dipped in a 10 mM/L ethanol solution including 3-APTES for 30 minutes, cleaned using ethanol and pure water, and dried with an air blower.

(6) Formation of Plate-Shaped Particle Layer

The resin film electrostatically treated according to the process (5) is dipped in the solution for forming a plate-shaped particle layer according to the process (3) for 15 minutes, sufficiently cleaned with pure water, and dried with an air blower, thereby forming a plate-shaped particle layer.

(7) Formation of Binder Layer

The resin film having the plate-shaped particle layer according to (6) is dipped in the solution for forming binder particles according to (4) for 15 minutes, sufficiently cleaned with pure water, and dried with an air blower, forming a binder layer.

(8) Formation of Stacked Layer

The processes (6) and (7) are respectively repeated 5, 10, and 20 times to form a stacked layer by laminating 5, 10, and 20 units of plate-shaped particle layers/binder layers on the resin film, obtaining a barrier film.

(9) Measurement of WVTR

The resin film having an adsorption layer formed according to the process (2) and three sheets of the barrier film according to the process (8) are measured regarding WVTR using a water vapor transmission measurement device (AQUATRAN®, MOCON Co.).

Example 5

(1) Cleaning of Resin Film

A 0.2 mm-thick PEN film (Teonex® Q65FA, Teijin DuPont Films Ltd.) is cleaned with a detergent and pure water and dried with an air blower.

(2) Formation of Adsorption Layer

The cleaned resin film is coated with PHPS (Aquamica NL 100A, AZ Electronic Materials Co.) and cured at 200° C. for 1 hour. Then, the coated film is cured under a condition of 95° C./80% RH for 3 hours, forming an about 0.5 μm-thick silica layer.

(3) Preparation of Solution for Forming Plate-Shaped Particle Layer

Then, 0.5 g of MMT (Kunfil-D36, Kunimine Industries Co.) is put in 1 L of pure water, and the mixture is agitated with a stirrer for one day, preparing a solution for forming a plate-shaped particle layer.

(4) Preparation of Solution for Forming Binder Layer

A 30 mM/L polyallylamine hydrochloric acid salt aqueous solution is prepared as a solution for forming a binder layer.

(5) Electrostatic Treatment of Resin Film

The resin film having an adsorption layer electrostatically treated according to the process (2) is dipped in a 10 mM/L ethanol solution including 3-APTES for 30 minutes, cleaned with ethanol and pure water, and dried with an air blower.

(6) Formation of Plate-Shaped Particle Layer

The resin film electrostatically treated according to the process (5) is dipped in the solution for forming a plate-shaped particle layer according to the process (3) for 15 minutes, sufficiently cleaned with pure water, and dried with an air blower, forming a plate-shaped particle layer.

(7) Formation of Binder Layer

The resin film having the plate-shaped particle layer according to (6) is dipped in the solution for forming binder particles according to (4) for 15 minutes, sufficiently cleaned with pure water, and dried with an air blower, forming a binder layer.

(8) Formation of Stacked Layer

The processes (6) and (7) are respectively repeated 5, 10 and 20 times to form a stacked layer by laminating 5, 10 and 20 units of plate-shaped particle layers/binder layers on the resin film, obtaining a barrier film.

(9) Formation of Planarization Layer

On the stacked layer according to the process (8), PHPS (Aquamica NL 100A, AZ Electronic Materials Co.) is spin-coated and cured at 200° C. for 1 hour. Then, the coated perhydropolysilazane is cured under a condition of 95° C./80% RH for 3 hours to form an about 0.1 μm-thick silica layer.

(10) Measurement of WVTR

Three sheets of the barrier films according to the process (8) are measured regarding WVTR using a water vapor transmission measurement device (AQUATRAN®, MOCON Co.).

(11) AFM Examination

The barrier film having the adsorption layers and 20 units of the plate-shaped particle layers according to the process (8) and another barrier film having the adsorption layer, 20 units of the plate-shaped particle layers, and a planarized layer according to the process (9) are examined using an atomic force microscope (SPA 400, SII Nanotechnology Inc.) and identified regarding adsorption state of the MMT.

Example 6

(1) Cleaning of Resin Film

A 0.2 mm-thick PEN film (Teonex® Q65FA, Teijin DuPont Films Ltd.) is cleaned using a detergent and pure water, and then dried with an air blower.

(2) Formation of Adsorption Layer

On the cleaned resin film, PHPS (Aquamica NL 100A, AZ Electronic Materials Co.) is spin-coated and cured at 200° C. for 1 hour. Then, the coated PHPS is cured under a condition of 95° C./80% RH for 3 hours, forming an about 0.5 μm-thick silica layer.

(3) Preparation of Solution for Forming Plate-Shaped Particle Layer 1 g of α-Zirconium Phosphate (α-ZrP) (manufactured by DAIICHI KIGENSO KAGAKU KOGYO) and 150 mL of pure water are agitated using a stirrer for one day. Next, 30 mL of aqueous solution including 150 mM/L tetrabutylammonium hydroxide is added in a small amount to the solution, so that the ZrP solution may not have pH greater than 9, to exfoliate a ZrP particle layer and prepare a solution for forming a plate-shaped particle layer.

(4) Preparation of Solution for Forming Binder Layer

A 30 mM/L AlK(SO$_4$)$_2$ aqueous solution is prepared as a solution for forming a binder layer.

(5) Electrostatic Treatment of Resin Film

The resin film having the adsorption layer according to the process (2) is dipped in a 10 mM/L ethanol solution including 3-APTES for 30 minutes, cleaned with ethanol and pure water, dried with an air blower.

(6) Formation of Plate-Shaped Particle Layer

The resin film electrostatically treated according to the process (5) is dipped in the solution for forming a plate-shaped particle layer for 15 minutes, cleaned with pure water, and dried with an air blower, forming a plate-shaped particle layer.

(7) Formation of Binder Layer

The resin film having the plate-shaped particle layer according to the process (6) is dipped in the solution for forming binder particles for 15 minutes, sufficiently cleaned with pure water, and dried with an air blower, forming a binder layer.

(8) Formation of Stacked Layer

The processes (6) and (7) are respectively repeated 5, 10, and 20 times to form a stacked layer by laminating 5, 10, and 20 units of plate-shaped particle layers/binder layers on the resin film, obtaining a barrier film.

(9) Measurement of WVTR

The resin film having the adsorption layer formed according to the process (2) and three sheets of the barrier film according to the process (8) are measured regarding WVTR using a water vapor transmission measurement device (AQUATRAN®, MOCON Co.).

Example 7

(1) Cleaning of Resin Film

A 0.2 mm-thick PEN film (Teonex® Q65FA, Teijin DuPont Films Ltd.) is cleaned using a detergent and pure water, and then dried with an air blower.

(2) Formation of Adsorption Layer

On the cleaned resin film, PHPS (Aquamica NL 100A, AZ Electronic Materials Co.) is spin-coated and cured at 200° C. for 1 hour. Then, the coated PHPS is cured under a condition of 95° C./80% RH for 3 hours, forming an about 0.5 µm-thick silica layer.

(3) Preparation of Solution for Forming Plate-Shaped Particle Layer

Then, 0.5 g of MMT (Kunfil-D36, Kunimine Industries Co.) is put in 1 L of pure water, and the mixture is agitated with a stirrer for one day, preparing a solution for forming a plate-shaped particle layer.

(4) Preparation of Solution for Forming Binder Layer

A 30 mM/L ethanol solution including 3-aminopropyltri-ethoxysilane is prepared as a solution for forming a binder layer.

(5) Electrostatic Treatment of Resin Film

The resin film having the adsorption layer according to the process (2) is dipped in a 10 mM/L ethanol solution including 3-APTES for 30 minutes, cleaned with ethanol and pure water, and dried with an air blower.

(6) Formation of Plate-Shaped Particle Layer

The resin film electrostatically treated according to the process (5) is dipped in the solution for forming a plate-shaped particle layer according to the process (3) for 15 minutes, sufficiently cleaned with pure water, and dried with an air blower, forming a plate-shaped particle layer.

(7) Formation of Binder Layer

The resin film having the plate-shaped particle layer according to the process (6) is dipped in the solution for forming binder particles according to the process (4) for 15 minutes, sufficiently cleaned with pure water, and dried with an air blower, forming a binder layer.

(8) Formation of Stacked Layer

The processes (6) and (7) are respectively repeated 5, 10 and 20 times to form a stacked layer by respectively laminating 5, 10 and 20 units of plate-shaped particle layers/binder layers on the resin film, obtaining a barrier film.

9) Measurement of WVTR

The resin film having the adsorption layer formed according to the process (2) and three sheets of the barrier film according to the process (8) are measured regarding WVTR using a water vapor transmission measurement device (AQUATRAN®, MOCON Co.).

Comparative Example 1

A barrier film is fabricated according to the same method as Example 2 except for forming no adsorption layer without the process (2).

Evaluation 1: Measurement of WVTR

Table 1 shows water vapor transmission rates of the samples according to Examples 1 to 6 and Comparative Example 1 measured under a condition of 40° C./90% RH.

TABLE 1

|  | Ex. 1 | Ex. 2 | Ex. 3 | Ex. 4 | Ex. 5 | Ex. 6 | Ex. 7 | Comp. Ex. 1 |
| --- | --- | --- | --- | --- | --- | --- | --- | --- |
| Adsorption layer material | PHPS | PHPS | TEOS | alumina | PHPS | PHPS | PHPS | None |
| Electrostatic treatment | corona | APTES | APTES | APTES | APTES | APTES | APTES | APTES |
| Plate-shaped particle layer | MMT | MMT | MMT | MMT | MMT | ZrP | MMT | MMT |
| Binder layer | PAH | PAH | PAH | PAH | PAH | Al | APTES | PAH |

TABLE 1-continued

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Number | 0 | NA | 0.0100 | 0.9091 | 0.0990 | NA | NA | NA | 10.1546 |
| of | 5 | 0.0075 | 0.0053 | 0.0744 | 0.0101 | 0.0043 | 0.0093 | 0.0010 | 0.9021 |
| stacking | 10 | 0.0060 | 0.0036 | 0.0388 | 0.0053 | 0.0031 | 0.0088 | 0.0005 | 0.3146 |
| layers (unit) | 20 | 0.0043 | 0.0022 | 0.0198 | 0.0028 | 0.0020 | 0.0078 | <0.0005 | 0.1558 |

Referring to Table 1, the samples of Examples 1 to 7 have substantially lower WVTR than Comparative Example 1. The samples according to Examples 1 to 7 have improved barrier performance compared with the sample according to Comparative Example 1. In an embodiment, more plate-shaped particles are adsorbed by the adsorption layer and increased volume fraction of plate-shaped particles included in the stacked layer.

The samples of Examples 2 to 4 have substantially low WVTR, e.g., WVTR of less than 0.1 g/m²/day in the adsorption layer than the sample of Example 3. In the sample of Examples 2 to 4, the adsorption layer substantially reduces or effectively prevents moisture from entering the stacked layer and thus keeps the binder layer from absorbing polyallylamine hydrochloric acid salt ("PAH").

Accordingly, an adsorption layer having high barrier performance may effectively increase barrier performance of a stacked layer as well as decrease drawbacks of a plate-shaped particle layer.

Evaluation 2: AFM Examination

The samples according to Examples 2 and 5 and Comparative Example 1 are examined using AFM. The results are provided in FIGS. 3A to 3D. The AFM had a view of 1 μm.

Figure 3A:
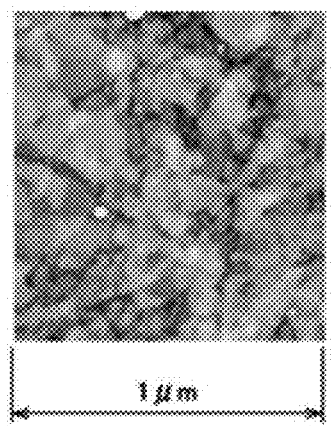
FIG. 3A is an atomic force microscopy ("AFM") photograph showing the sample according to Example 2.
Figure 3B:
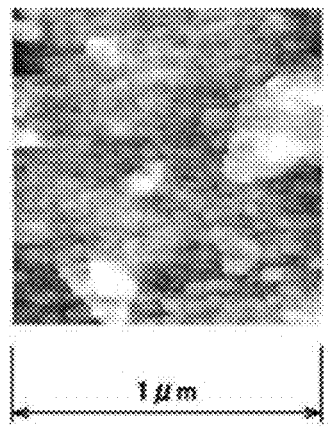
FIG. 3B is an AFM photograph showing the sample including the planarization layer according to Example 5.
Figure 3C:
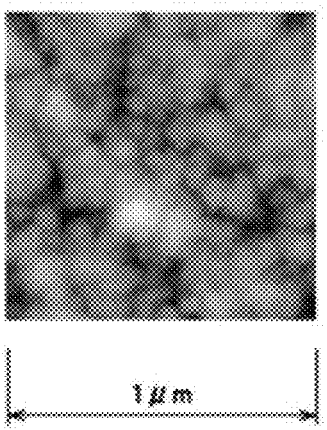
FIG. 3C is an AFM photograph showing the sample without the planarization layer according to Example 5.
Figure 3D:
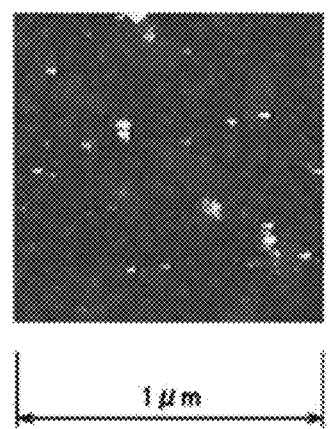
FIG. 3D is an AFM photograph showing the sample according to Comparative Example 1.

FIG. 3A is an AFM photograph of the sample according to Example 2, FIG. 3B is an AFM photograph of the sample including the planarization layer according to Example 5, FIG. 3C an AFM photograph of the sample without the planarization layer according to Example 5, and FIG. 3D is an AFM photograph of the sample according to Comparative Example 1.

Referring to FIGS. 3A and 3D, the sample according to Example 2 adsorbs more plate-shaped particles than the sample according to Comparative Example 1.

Table 2 shows a coating ratio of an area where the plate-shaped particles are attached and a volume fraction of the plate-shaped particles included in the stacked layer, which is calculated from the coating ratio.

TABLE 2

| | Coating ratio (%) | Volume fraction (%) |
|---|---|---|
| Example 2 | 95 | 85 |
| Comparative Example 1 | 50 | 37 |

Referring to FIGS. 3B and 3C, the two samples having a planarization layer have average surface roughness of less than or equal to 0.3 nm and 1 nm, respectively, while the sample having no planarization layer has average surface roughness of 4.8 nm in two samples according to Example 5. Accordingly, embodiments of the invention may be effectively applied to form a planarization layer for an OLED by providing flatness of a substrate.

Evaluation 3: Measurement of Thickness

Table 3 shows thickness of the stacked layer included in the sample according to Example 2.

TABLE 3

| | Number of stacking layers (unit) | | |
|---|---|---|---|
| | 5 | 10 | 20 |
| Thickness (nm) | 6.1 | 11.9 | 22.9 |

Referring to Table 3, the stacked layer of the sample according to Example 2 is substantially thin and has high gas barrier performance.

As shown in Table 3, when the stacked layer has a unit thickness of about 1.2 nm, and the MMT has a thickness of about 1 nm, the binder layer formed from PAH may be considered to have a thickness of about 0.2 nm.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A barrier film for an electronic device, comprising:
    a resin film;
    an adsorption layer disposed on a side of the resin film and including an inorganic material electrostatically chargeable with a positive charge or a negative charge and having higher hydrophilicity than a surface of the resin film; and
    a stacked layer disposed on a side of the adsorption layer, wherein the stacked layer comprises:
        a plate-shaped particle layer comprising an inorganic plate-shaped particle, which is electrostatically chargeable with a positive charge or a negative charge; and
        a binder layer comprising a binder particle, which is electrostatically chargeable with a positive charge or a negative charge,
        wherein the plate-shaped particle layer and the binder layer are alternately stacked, a ratio of the inorganic plate-shaped particle with respect to a total volume of the stacked layer is greater than or equal to about 50%, and the stacked layer has a thickness less than or equal to about 50 nm.

2. The barrier film for an electronic device of claim 1, wherein the inorganic material is electrostatically chargeable with a charge opposite to a charge of the inorganic plate-shaped particle or the binder particle.

3. The barrier film for an electronic device of claim 2, wherein the binder particle is electrostatically chargeable with a charge opposite to a charge of the inorganic plate-shaped particle.

4. The barrier film for an electronic device of claim 1, wherein the inorganic material comprises a metal, a metallic compound, a composite material of a metal and an organic material, a composite material of a metallic compound and an organic material, or a combination thereof.

5. The barrier film for an electronic device of claim 4, wherein the inorganic material comprises a metal oxide.

6. The barrier film for an electronic device of claim 5, wherein the metal oxide comprises silica, alumina or a combination thereof.

7. The barrier film for an electronic device of claim 1, wherein the inorganic plate-shaped particle comprises a clay mineral, a phosphate derivative compound, layered double hydroxides or a combination thereof.

8. The barrier film for an electronic device of claim 1, wherein the adsorption layer has a thickness greater than or equal to about 0.1 μm.

9. The barrier film for an electronic device of claim 8, wherein the adsorption layer has a thickness in a range of about 0.1 μm to about 10 μm.

10. The barrier film for an electronic device of claim 1, further comprising:
a planarization layer disposed on a side of the stacked layer.

11. The barrier film for an electronic device of claim 10, wherein the planarization layer has a surface roughness that is less than a surface roughness of the stacked layer.

* * * * *